United States Patent
Champagne

(10) Patent No.: US 8,739,920 B2
(45) Date of Patent: Jun. 3, 2014

(54) ELECTRIC POWER STEERING SIMULATED TRAVEL STOPS

(75) Inventor: Anthony J. Champagne, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 176 days.

(21) Appl. No.: 13/298,975

(22) Filed: Nov. 17, 2011

(65) Prior Publication Data

US 2012/0205185 A1 Aug. 16, 2012

Related U.S. Application Data

(60) Provisional application No. 61/443,438, filed on Feb. 16, 2011.

(51) Int. Cl.
*B62D 5/06* (2006.01)

(52) U.S. Cl.
USPC .............................................. 180/446; 701/42

(58) Field of Classification Search
USPC ................................ 180/443, 446; 701/41, 42
See application file for complete search history.

(56) References Cited

U.S. PATENT DOCUMENTS

| 6,408,235 B1 * | 6/2002 | Tanke et al. ..................... 701/41 |
| 7,295,905 B2 * | 11/2007 | Yao et al. ......................... 701/41 |
| 7,920,946 B2 * | 4/2011 | Champagne ..................... 701/41 |
| 2011/0010053 A1 | 1/2011 | Champagne |

FOREIGN PATENT DOCUMENTS

FR 2850076 A1 7/2004

OTHER PUBLICATIONS

European Search Report for Application No. 12155602.1 dated Apr. 4, 2013; 6 pages.

* cited by examiner

*Primary Examiner* — Kevin Hurley
(74) *Attorney, Agent, or Firm* — Cantor Colburn LLP

(57) ABSTRACT

A control system for controlling a steering system is provided. The control system includes a first module that determines a position control value based on a handwheel position. A second module generates a torque command based on the position control value to simulate an end of travel stop in the steering system.

16 Claims, 3 Drawing Sheets

ELECTRIC POWER STEERING SIMULATED TRAVEL STOPS

CROSS-REFERENCE TO RELATED APPLICATIONS

This patent application claims priority to U.S. Provisional Patent Application Serial No. 61/443,438, filed Feb. 16, 2011 which is incorporated herein by reference in its entirety.

BACKGROUND OF THE INVENTION

The present invention relates to methods and systems for controlling a steering system, and more particularly to methods and systems for simulating end stops in an electric power steering system.

When steering a vehicle into a mechanical steering system's corner, travel is limited by the mechanical end stops. In some situations, it may be desirable to simulate end stops in Electric Power Steering Systems (EPS).

SUMMARY OF THE INVENTION

In one embodiment, a control system for controlling a steering system is provided. The control system includes a first module that determines a position control value based on a handwheel position. A second module generates a torque command based on the position control value to simulate an end of travel stop in the steering system.

In another embodiment, a method of controlling a steering system is provided. The method includes determining a position control value based on a handwheel position, and generating a torque command based on the position control value to simulate an end of travel stop in the steering system.

In yet another embodiment, an electric power steering system for a vehicle is provided. The electric power steering system comprising a control module that determines a position control value based on a handwheel position, and that generates a torque command to the electric power steering system based on the position control value to simulate an end of travel stop in the electric power steering system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
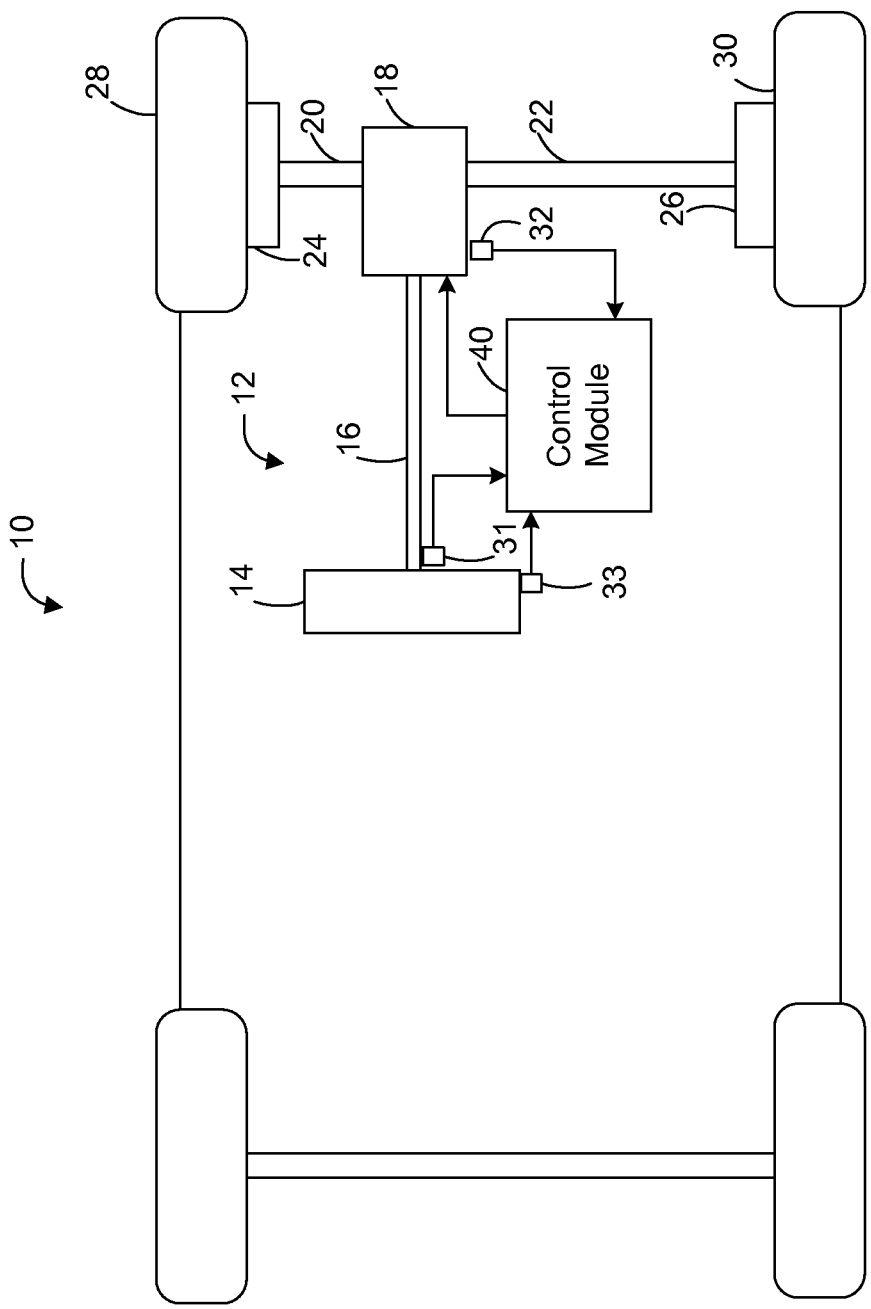
FIG. 1 is a functional block diagram illustrating a vehicle including a steering control system in accordance with an exemplary embodiment of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a handwheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses the torque applied to the handwheel 14 by the operator of the vehicle 10. The torque sensor generates a driver torque signal based thereon. In another example, the sensor 32 is a motor speed sensor that senses a rotational speed of the motor of the steering assist unit 18. The sensor 32 generates a motor speed or velocity signal based thereon. In yet another example, the sensor 33 is a handwheel position sensor that senses a position of the handwheel 14. The sensor 33 generates a handwheel position signal based thereon.

A control module 40 controls the operation of the steering system 12 based on one or more of the sensor signals and further based on the steering control systems and methods of the present disclosure. Generally speaking, the steering control systems and methods of the present disclosure generate a position related torque command signal that is position related to the steering system 12 to restrict the rotation of the handwheel 14 in an end of travel region, thus, simulating an end stop.

Figure 2:
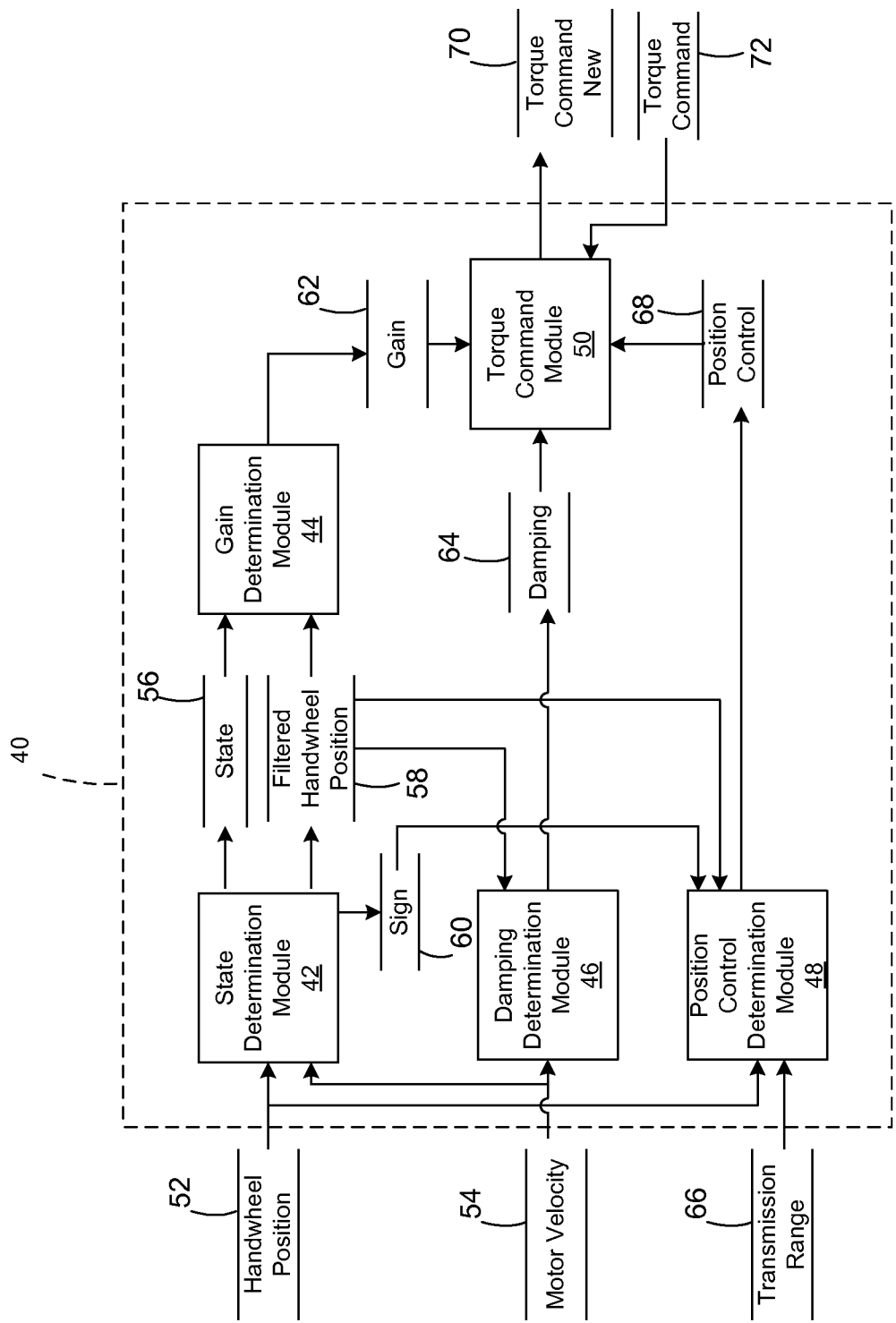
FIG. 2 is a dataflow diagram illustrating a steering control system in accordance with another exemplary embodiment of the invention.

Referring now to FIG. 2, a dataflow diagram illustrates an exemplary embodiment of the control module 40 of FIG. 1 used to control the steering system 12 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly generate the torque command signal to the steering system 12 (FIG. 1) to simulate an end of travel stop. Inputs to the control module 40 can be generated from the sensors 31, 32, 33 (FIG. 1) of the vehicle 10 (FIG. 1), can be received from other control modules (not shown) within the vehicle 10 (FIG. 1), can be modeled, and/or can be predefined.

In one example, the control module 40 includes a state determination module 42, a gain determination module 44, a damping determination module 46, a position control determination module 48, and a torque command module 50.

The state determination module 42 receives as input a handwheel position 52 and a motor velocity 54. Based on the inputs, the state determination module 42 determines a handwheel state 56 based on whether the steering system 12 (FIG. 1) is entering an end of travel region, holding within the region, or exiting the region. In various embodiments, the state determination module 42 determines a filtered handwheel position 58 (e.g., using a low pass filter or other filter) and a sign 60 of the handwheel position and uses the values to determine the handwheel state 56.

For example, the state determination module 42 classifies the state to be in one of four different handwheel positions 52: state 1 representing outside of the end or travel region; state 2 representing steering in to the end of travel region; state 3 representing holding within the end of travel region; and state 4 representing exiting the end of travel region.

When the handwheel position 52 is less than or equal to an end of travel (EOT) region threshold, the state determination module 42 determines the state to be state 1. When the handwheel position 52 is greater than the EOT region threshold and the motor velocity 54 is greater than an EOT velocity threshold, the state determination module 42 determines the state to be state 2. When the handwheel position 52 is greater than the EOT region threshold, the motor velocity 54 is less than or equal to the EOT velocity threshold, and the motor velocity 54 is greater than or equal to the negative EOT velocity threshold, the state determination module 42 determines the state to be state 3. When the handwheel position 52 is greater than the EOT region threshold, the motor velocity 54 is less than or equal to the EOT velocity threshold, and the motor velocity 54 is greater than the negative EOT velocity threshold, the state determination module 42 determines the state to be state 4.

The gain determination module 44 receives as input the handwheel state 56, and the filtered handwheel position 58. Based on the inputs, the gain determination module 44 determines a gain value 62. In various embodiments, the gain determination module 44 sets the gain value to one, zero, or a blended number therebetween. For example, when the filtered handwheel position 58 is less than a first angle threshold, the gain determination module 44 sets the gain value 62 to one. When the filtered handwheel position 58 exceeds the first angle threshold plus a determined range value, the gain determination module 44 sets the gain value 62 to zero. When the handwheel position 52 is between the first angle threshold and the first angle threshold plus the range value, the gain determination module 44 sets the gain value 62 based on a linear interpolation.

In various embodiments, the gain determination module 44 applies a lowpass filter to the gain value 62, with a cutoff frequency that depends on the handwheel state 56 indicating whether the driver is steering into or away from the end of travel region.

The damping determination module 46 receives as input motor velocity 54 and the filtered handwheel position 58. Based on the inputs, the damping determination module 46 determines a damping value 64. In various embodiments, the damping determination module 46 scales the motor velocity 54 based on the filtered handwheel position 58 to provided the damping value 64. For example, the damping determination module 46 determines a scaling value to be zero when the filtered handwheel position 58 is outside of the end of travel region, and determines the scaling value to be a non-zero value when the filtered handwheel position 58 is within the end of travel region. The scaling values can be determined by a position-dependent table. The damping determination module 46 then applies the scaling value to the motor velocity 54 to determine the damping value 64.

The position control determination module 48 receives as input transmission range 66, the handwheel position 52, the handwheel sign 60, and the filtered handwheel position 58. Based on the inputs, the position control determination module 48 determines a position control value 68. In various embodiments, the position control determination module 48 determines a position error and determines the position control value 68 based on the position error. For example, the position error can be based on a difference between the handwheel position 52 and the first angle threshold plus the range. Proportional (Kp), integral (Ki), and derivative (Kd) terms can be applied to the position error to generate an error signal. As can be appreciated, other control strategies besides PID may be used to generate the signal.

In various embodiments, the position control can be activated when the filtered handwheel position 58 exceeds the first angle threshold plus the range (Angle1+Range) so that it does not interfere with other torque control. In various embodiments, the position control can be performed based on whether the transmission range 66 indicates reverse.

The torque command module 50 receives as input the gain value 62, the damping value 64, the position control value 68, and a torque command 72. Based on the inputs, the torque command module 50 generates a new torque command signal 70. In various embodiments, the torque command module determines a torque command value (TrqCmdNew) based on the following equation:

$$TrqCmdNew=((TrqCmd-Damp)*Gain)-PosControl. \quad (1)$$

Where TrqCmd represents the torque command 72. Damp represents the damping value 64. Gain represents the gain value 62. PosControl represents the position control value 68.

The purpose of the gain is to scale the torque closed-loop control to zero near the end of travel. The damping output is used to reduce oscillations. As shown above, the damping can be subtracted before the multiplication by the gain value 62, or, in other embodiments, after the multiplication by the gain value 62. The torque command module 50 generates the torque command signal 70 based on the torque command value (TrqCmdNew).

Figure 3:
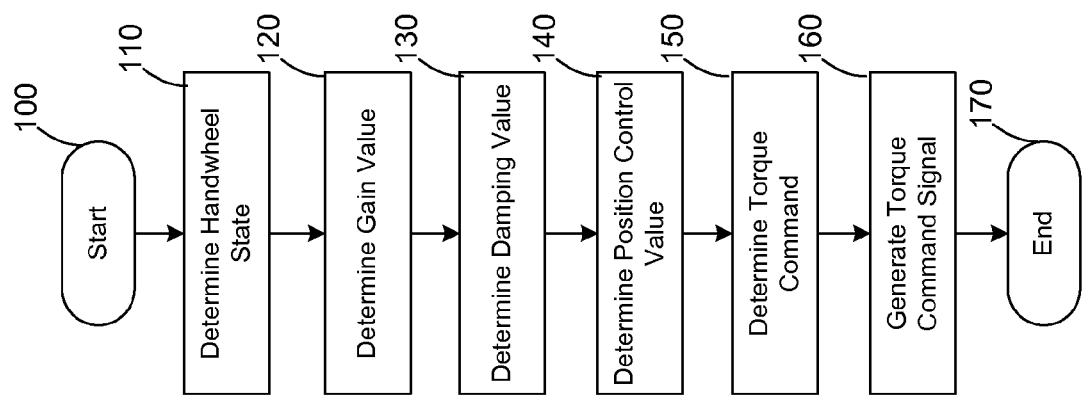
FIG. 3 is a flowchart illustrating exemplary a steering control method in accordance with yet another exemplary embodiment of the invention.

Referring now to FIG. 3, and with continued reference to FIGS. 1 and 2, a flowchart illustrates a steering control method that can be performed by the control module 40 of FIG. 1 in accordance with the present invention. As can be appreciated in light of the disclosure, the order of operation within the method is not limited to the sequential execution as illustrated in FIG. 3, but may be performed in one or more varying orders as applicable and in accordance with the present invention.

In various embodiments, the method can be scheduled to run based on predetermined events, and/or run continually during operation of the steering system 12.

In one example, the method may begin at 100. The handwheel position 52 and the motor velocity 54 are evaluated at 110 to determine the handwheel state 56. The gain value 62 is determined based on the filtered handwheel position 58 and, optionally based on the handwheel state 56 at 120. The damping value 64 is determined based on the motor velocity 54 and the filtered handwheel position 58 at 130. The position control value 68 is determined based on the filtered handwheel position 58 at 140. The torque command 72 is determined based on the gain value 62, the damping value 64, and the position control value 68 for example, as discussed above at 150. The torque command signal 70 is generated to control the steering system 12 to simulate end stops at 160. Thereafter, the method may end at 170.

Simulating end stops with the steering system 12 in this manner allows for avoidance of annoyances due to noise and vibration caused by harsh travel stop impacts. Furthermore, it may allow a common rack and pinion to be used on multiple vehicle platforms that have varying rack travel distances; and it prevents chassis forces into the steering system 12 from rotating the handwheel 14 to the mechanical end stops (e.g., this condition can occur when the vehicle 10 is accelerating in reverse).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for controlling a steering system, the control system comprising:
   a first module that determines a position control value based on a handwheel position; and
   a second module that receives the position control value from the first module, and generates a torque command based on the position control value and a gain value to simulate an end of travel stop in the steering system, the gain value determined based on a comparison between the handwheel position and a range of position values representing an end of travel region.

2. The control system of claim 1, further comprising a third module that determines the gain value based on a handwheel state, the handwheel state re representing one of: outside of the end of travel region, steering into the end of travel region, holding within the end of travel region, and exiting the end of travel region.

3. The control system of claim 2, further comprising a fourth module that determines a damping value and the second module generates the torque command based on the damping value.

4. The control system of claim 3, wherein the second module determines a torque value (TrqCmdNew) based on a torque command(TrqCmd), the damping value (Damp), the gain value (Gain), the position control value (PosControl) and an equation:

$$TrqCmdNew=((TrqCmd-Damp)*Gain)-PosControl,$$

and generates the torque command based on the torque value.

5. The control system of claim 1, further comprising a third module that determines a damping value and the second module generates the torque command based on the damping value.

6. The control system of claim 1, wherein the first module determines the position control value based on a transmission range.

7. The control system of claim 6, wherein the first module determines the position control value based on whether the transmission range is reverse.

8. The controls system of claim 1, wherein the first module determines the position control value based on a position error between the handwheel position and a range.

9. A method of controlling a steering system, the method comprising:
   determining a position control value based on a handwheel position;
   determining a gain value;
   generating a torque command based on the position control value and the gain value to simulate an end of travel stop in the steering system; and
   determining a damping value, wherein the torque command is based on the damping value.

10. The method of claim 9, further comprising determining a torque value (TrqCmdNew) based on a torque command (TrqCmd), the damping value (Damp), the gain value (Gain), the position control value (PosControl) and an equation:

$$TrqCmdNew=((TrqCmd-Damp)*Gain)-PosControl,$$

and the generating a torque command is based on the torque value.

11. A method of controlling a steering system, the method comprising:
   determining a position control value based on a handwheel position; and
   generating a torque command based on the position control value to simulate an end of travel stop in the steering system, wherein the determining the position control value is based on a transmission range.

12. The method of claim 11, wherein the determining the position control value is based on whether the transmission range is reverse.

13. A control system for controlling a steering system, the control system comprising:
   a first module that determines a position control value based on a handwheel position;
   a second module that receives the position control value from the first module, and generates a torque command based on the position control value to simulate an end of travel stop in the steering system; and
   a third module that determines a damping value and the second module generates the torque command based on the damping value.

14. A method of controlling a steering system, the method comprising:
   determining a position control value based on a handwheel position; and
   generating a torque command based on the position control value to simulate an end of travel stop in the steering system, wherein the determining the position control value is based on a position error between the handwheel position and a range.

15. An electric power steering system for a vehicle, comprising:
   a handwheel position sensor; and
   a control module that receives a handwheel position from the handwheel position sensor and determines a position control value based on the handwheel position, and that generates a torque command to the electric power steering system based on the position control value to simulate an end of travel stop in the electric power steering system, wherein the control module determines a damping value and generates the torque command based on the damping value.

16. The system of claim 15, wherein the control module determines a gain value and generates the torque command based on the gain value.

* * * * *